(12) United States Patent
Yoshida et al.

(10) Patent No.: US 11,732,517 B2
(45) Date of Patent: Aug. 22, 2023

(54) DAMPER DEVICE

(71) Applicant: SUGATSUNE KOGYO CO., LTD., Tokyo (JP)

(72) Inventors: Masahiro Yoshida, Tokyo (JP); Yota Miyoshi, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 160 days.

(21) Appl. No.: 17/309,866

(22) PCT Filed: Dec. 12, 2019

(86) PCT No.: PCT/JP2019/048623
§ 371 (c)(1),
(2) Date: Jun. 24, 2021

(87) PCT Pub. No.: WO2020/137570
PCT Pub. Date: Jul. 2, 2020

(65) Prior Publication Data
US 2022/0049535 A1 Feb. 17, 2022

(30) Foreign Application Priority Data

Dec. 27, 2018 (JP) ................. 2018-244675

(51) Int. Cl.
E05F 3/20 (2006.01)
E05F 3/14 (2006.01)
(Continued)

(52) U.S. Cl.
CPC ................ E05F 3/14 (2013.01); A47K 13/12 (2013.01); F16F 9/16 (2013.01);
(Continued)

(58) Field of Classification Search
CPC ....... E05D 11/06; E05D 11/08; E05D 11/082; E05D 11/084; E05D 11/10; E05D 11/105;
(Continued)

(56) References Cited

U.S. PATENT DOCUMENTS 5,165,507 A * 11/1992 Ohshima ............... E05F 3/14
192/81 C
9,492,041 B1 * 11/2016 Liang ................... F16F 9/44
(Continued)

FOREIGN PATENT DOCUMENTS

EP 2208912 A1 7/2010
JP S51122927 A 10/1976
(Continued)

OTHER PUBLICATIONS

EPO, European Search Report dated Sep. 20, 2022 in the corresponding European patent application No. 19906086.4, 7 pages.
(Continued)

Primary Examiner — Chuck Y Mah
(74) Attorney, Agent, or Firm — Masuvalley & Partners; Peter R. Martinez

(57) ABSTRACT

Provided is a damper device capable of increasing torque of a coil spring without increasing an outer diameter of a case. The damper device includes the case (2), a shaft (3) that is relatively rotatable with respect to the case (2), fluid filled in a damper chamber (5) formed between the case (2) and the shaft (3), a bearing member (4) that forms a partition wall (5a) that closes one end of the damper chamber (5) in an axial direction and is separate from the shaft (3), and a coil spring (9) having one end connected to a side of the case (2) and the other end connected to the shaft (3) or the bearing member (4) to apply torque to the shaft (3) with respect to
(Continued)

the case (2). The bearing member (4) is arranged between a winding portion (9a) of the coil spring (9) and the damper chamber.

9 Claims, 5 Drawing Sheets

(51) Int. Cl.
*A47K 13/12* (2006.01)
*F16F 9/16* (2006.01)
(52) U.S. Cl.
CPC ... *E05Y 2201/212* (2013.01); *E05Y 2201/224* (2013.01); *E05Y 2201/638* (2013.01)
(58) Field of Classification Search
CPC ......... E05D 11/1064; E05D 2011/1035; E05D 3/02; E05Y 2201/638; E05Y 2201/212; E05Y 2201/224; E05Y 2201/254; E05Y 2201/256; E05Y 2800/298; E05Y 2900/132; E05Y 2900/134; E05Y 2900/20; E05Y 2900/31; E05Y 2900/312; E05Y 2900/614; E05F 3/14; E05F 3/16; E05F 3/20; E05F 5/04; F16C 11/103; F16F 9/16; Y10T 16/5345; Y10T 16/54038; Y10T 16/54028; A47K 13/12; F05F 2005/046
See application file for complete search history.

(56) References Cited

U.S. PATENT DOCUMENTS

| | | | |
|---|---|---|---|
| 2003/0009819 A1* | 1/2003 | Mizuno | F16F 9/3221 4/248 |
| 2009/0025181 A1* | 1/2009 | Burger | E05F 3/20 16/286 |
| 2010/0270113 A1* | 10/2010 | Ogawa | A47K 13/12 188/281 |
| 2012/0080278 A1* | 4/2012 | Lee | A47K 13/12 188/283 |
| 2020/0048948 A1* | 2/2020 | Kuramochi | E05F 3/14 |

FOREIGN PATENT DOCUMENTS

| | | |
|---|---|---|
| JP | 3280941 B2 | 5/2002 |
| JP | 2002-371741 A | 12/2002 |
| JP | 2010-019300 A | 1/2010 |
| JP | 2018-204618 A | 12/2018 |
| WO | WO95/08941 A1 | 4/1995 |

OTHER PUBLICATIONS

WIPO, JP International Search Authority, International Search Report and Written Opinion dated Mar. 3, 2020 in International Patent Application No. PCT/JP2019/048623, 9 pages.

* cited by examiner (a)             (b)

(a)

(b)

DAMPER DEVICE

RELATED APPLICATIONS

This application is the U.S. National Phase of and claims priority to International Patent Application No. PCT/JP2019/048623, International Filing Date Dec. 12, 2019, entitled DAMPER DEVICE; which claims benefit of Japanese Application No. JP2018-244675 filed Dec. 27, 2018 entitled DAMPER DEVICE; both of which are incorporated herein by reference in their entireties.

TECHNICAL FIELD

The present invention relates to a damper device for braking rotation of a rotating body such as a toilet lid and a toilet seat.

BACKGROUND

As a damper device of this type, there is known a damper device including a case and a shaft that is relatively rotatable with respect to the case (see, Patent Document 1). For example, the case is attached to a toilet bowl and the shaft is attached to a toilet lid or a toilet seat. A damper chamber between the case and the shaft is filled with a viscous fluid. When the shaft rotates with respect to the case, damper force that brakes the rotation of the shaft is generated due to resistance of fluid flowing through a flow path. Therefore, impact when the toilet lid or the toilet seat is closed is reduced.

In the damper device described in Patent Document 1, a coil spring (a spring that generates a torsional moment and is also called a torsion spring) is incorporated in the case. The coil spring applies torque in the opening direction to the shaft with respect to the case so that the toilet lid or the toilet seat can be lifted lightly.

PRIOR ART DOCUMENT

Patent Document

The Patent Document 1 is Japanese Patent No. 3280941

SUMMARY OF THE INVENTION

Problem to be Solved by the Invention

However, in a conventional damper device, a coil spring is arranged inside an annular damper chamber. Therefore, there is a problem that an outer diameter of a winding portion of the coil spring is small and torque of the coil spring cannot be increased. If a diameter of the winding portion of the coil spring is small, a wire diameter of the coil spring must be reduced, and the torque of the coil spring becomes small. When the rotating body is heavy and the torque of the coil spring is small, the rotating body cannot be lifted lightly.

Therefore, an object of the present invention is to provide a damper device capable of increasing torque of a coil spring without increasing the outer diameter of the case.

Means for Solving the Problem

In order to solve the above problem, one aspect of the present invention is a damper device including a case, a shaft that is relatively rotatable with respect to the case, fluid filled in a damper chamber formed between the case and the shaft, a bearing member that forms a partition wall that closes one end of the damper chamber in an axial direction and is separate from the shaft, and a coil spring having one end connected to a side of the case and the other end connected to the shaft or the bearing member to apply torque to the shaft with respect to the case, wherein the bearing member is arranged between a winding portion of the coil spring and the damper chamber, and the winding portion of the coil spring and the damper chamber are separated from each other in the axial direction.

Effect of the Invention

According to the present invention, an outer diameter of the winding portion of the coil spring can be increased without increasing an outer diameter of the case. Therefore, the torque of the coil spring can be increased. Further, since the bearing member that closes one end of the damper chamber is arranged between the winding portion of the coil spring and the damper chamber, it is possible to prevent the fluid filled in the damper chamber from leaking to a side of the coil spring.

MODE FOR CARRYING OUT THE INVENTION

Hereinafter, based on the accompanying drawings, the damper device of each of the embodiments according to the present invention will be described in detail. However, the damper device of the present invention can be embodied in various forms and is not limited to the embodiments described herein. These embodiments are provided with an intention that the disclosure of the specification is made sufficient to enable a person skilled in the art to fully understand the scope of the invention.

First Embodiment

Figure 1:
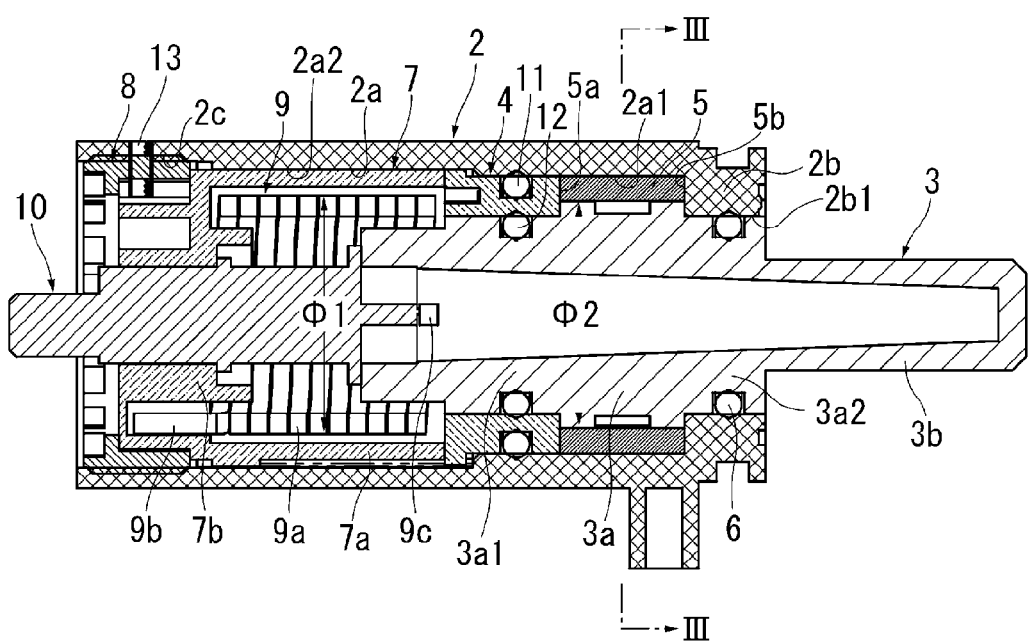
FIG. 1 is a cross-sectional view taken along the axis of the damper device of the first embodiment according to the present invention.
Figure 2:
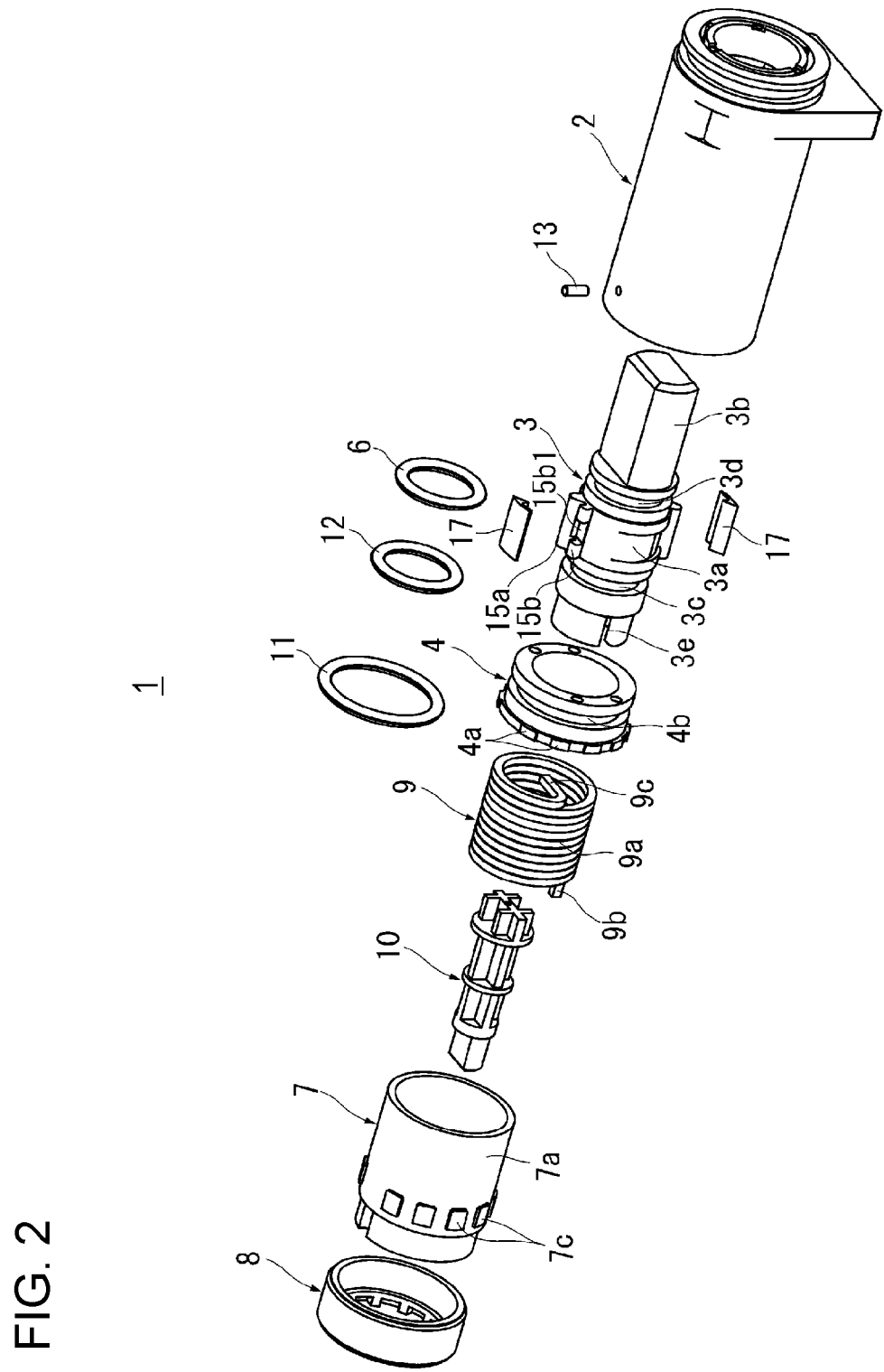
FIG. 2 is an exploded perspective view of the damper device of the first embodiment.

FIG. 1 is a cross-sectional view taken along the axis of the damper device of the first embodiment according to the present invention and FIG. 2 is an exploded perspective view of the damper device of the first embodiment. The damper device 1 of this embodiment is provided between the toilet bowl and the toilet lid or the toilet seat in order to rotate the toilet lid or the toilet seat at a low speed. The damper device 1 includes a case 2 and a shaft 3 that is respectively rotatable with respect to the case 2. One of the case 2 and the shaft 3 is attached to the toilet bowl, and the other is attached to the toilet lid or the toilet seat. As a result, the toilet lid (or toilet seat) is rotatably connected to the toilet bowl. Of course, the damper device 1 according to the present invention can be used for applications other than the toilet lid or the toilet seat.

The case 2 has a substantially tubular shape and has a fitting hole 2a penetrating a central portion thereof. The case 2 has a damper housing part 2a1 and a coil spring housing part 2a2 in an axial direction thereof. A step is formed between the damper housing part 2a1 and the coil spring housing part 2a2. An end wall 2b is provided at one end of the case 2 in the axial direction. A support hole 2b1 that rotatably supports the penetrating shaft 3 is formed in the end wall 2b. A screw 2c is formed on an inner surface of the other end of the case 2 in the axial direction.

The shaft 3 includes a shaft part 3a inserted into the fitting hole 2a of the case 2 and a connecting part 3b protruding from the end wall 2b of the case 2. The shaft part 3a is rotatably supported by the case 2 by rotatably fitting journal portions 3a1 and 3a2 formed at both ends thereof to the end wall 2b and a bearing member 4. A sealing member 6 such as an O-ring that prevents fluid filled in a damper chamber 5 from leaking is arranged between the journal portion 3a2 and the end wall 2b. A groove 3d into which the sealing member 6 is fitted is formed on an outer surface of the journal portion 3a2 (see FIG. 2). The connecting part 3b of the shaft 3 has a pair of parallel flat surfaces and is connected to either the toilet lid (or toilet seat) or the toilet bowl.

The shaft 3 is inserted into the fitting hole 2a of the case 2 in one direction (to the right direction in FIG. 1). By abutting a step portion formed on the shaft part 3a on the end wall 2b, the shaft 3 is prevented from coming off from the end wall 2b in one direction (in the right direction in FIG. 1). Further, after inserting the shaft 3 into the case 2, the bearing member 4 and a spring holding member 7 are inserted into the case 2, and by screwing a lid member 8 into the case 2, the shaft 3 is prevented from coming off in the other direction (in the left direction in FIG. 1).

The annular damper chamber 5 is formed between the case 2 and the shaft 3. The damper chamber 5 is filled with a viscous fluid or the like.

The bearing member 4 has an annular shape and is separate from the shaft 3. The bearing member 4 is inserted in the one direction (in the right direction in FIG. 1) between the case 2 and the shaft 3 after the damper chamber 5 is filled with the fluid. By abutting the bearing member 4 on the step portion of the shaft part 3a, movement of the bearing member 4 in the one direction is restricted. The bearing member 4 forms a partition wall 5a that closes one end of the damper chamber 5 in the axial direction. A partition wall 5b that closes the other end of the damper chamber 5 in the axial direction is formed on the end wall 2b of the case 2. In this regard, the partition wall 5b that closes the other end of the damper chamber 5 may be formed on the shaft 3 or may be formed on the bearing member that is separate from the shaft 3.

The bearing member 4 is non-rotatable with respect to the case 2 and is movable in the axial direction so that damper force can be adjusted. A plurality of protrusions 4a (see FIG. 2) are formed on an outer surface of the bearing member 4 in a circumferential direction. A groove that fits into the protrusion 4a is formed on an inner surface of the fitting hole 2a of the case 2. An annular fixed sealing member 11 for preventing the fluid filled in the damper chamber 5 from leaking is arranged between the case 2 and the bearing member 4. On the outer surface of the bearing member 4, a groove 4b into which the fixed sealing member 11 is fitted is formed (see FIG. 2).

The shaft 3 is rotatable with respect to the bearing member 4. A sliding sealing member 12 such as an O-ring that prevents the fluid from leaking is arranged between the bearing member 4 and the shaft 3. On an outer surface of the shaft 3, a groove 3c into which the sliding sealing member 12 is fitted is formed (see FIG. 2).

Since the sliding sealing member 12 is arranged on the outer surface of the shaft 3, the bearing member 4 is arranged on an outside of the sliding sealing member 12, and the fixed sealing member 11 is arranged on the outer surface of the bearing member 4, sliding resistance when the shaft 3 rotates can be suppressed and stable damper performance can be maintained.

A coil spring 9 is arranged between the bearing member 4 and a spring holding member 7. The coil spring 9 is inserted into the case 2 in the one direction (in the right direction in FIG. 1). The coil spring 9 includes a winding portion 9a, one end 9b, and the other end 9c (see FIG. 2). The one end 9b of the coil spring 9 is connected to a side of the case 2. In this embodiment, the one end 9b of the coil spring 9 is connected to the spring holding member 7. The spring holding member 7 is non-rotatable with respect to the case 2. The spring holding member 7 is formed with a hole into which the one end 9b of the coil spring 9 is fitted. The one end 9b of the coil spring 9 may be connected to the case 2.

Figure 3:
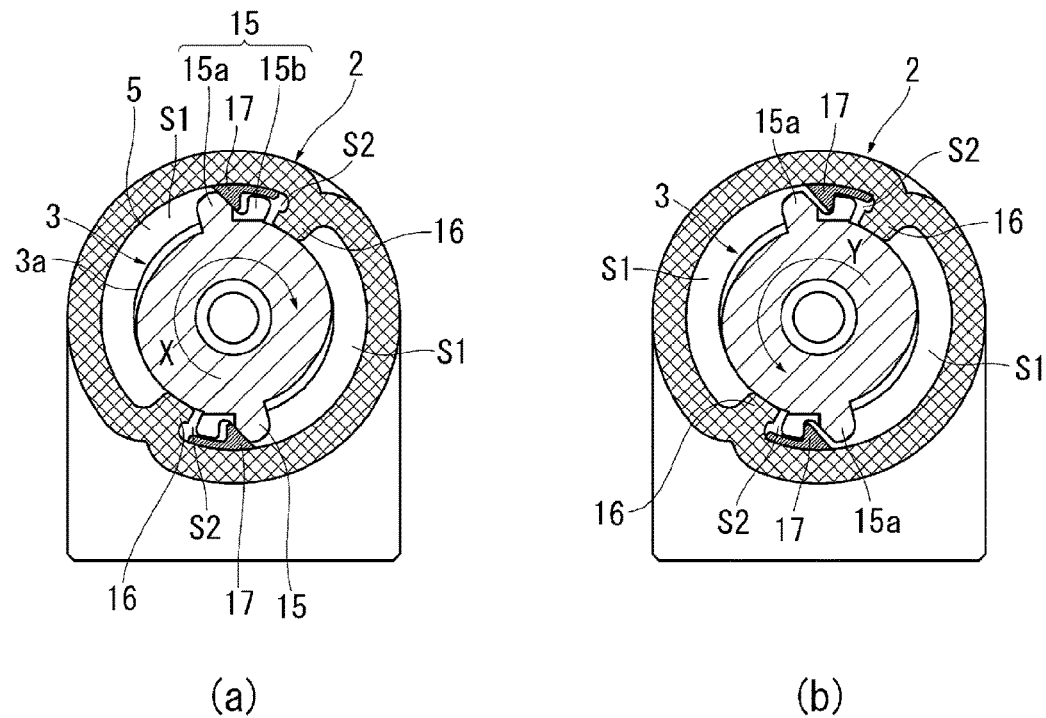
FIG. 3 is a cross-sectional view taken along line III-III of FIG. 1 (FIG. 3 (*a*) shows a case where the shaft rotates in a closing direction, and FIG. 3 (*b*) shows a case where the shaft rotates in an opening direction).

The other end 9c of the coil spring 9 is connected to the shaft 3. The shaft 3 is formed with a notch 3e into which the other end 9c of the coil spring 9 is fitted (see FIG. 2). The one end 9b of the coil spring 9 is connected to the side of the case 2, and the other end 9c is connected to the side of the shaft 3. The coil spring 9 applies torque to the shaft 3 with respect to the case 2 and energizes the case 2 in the direction of opening the toilet lid (or toilet seat) (in the direction of arrow Y in FIG. 3(b)). Therefore, the toilet lid (or toilet seat) can be lifted lightly.

A bearing member 4 is arranged between the winding portion 9a of the coil spring 9 and the damper chamber 5. The winding portion 9a of the coil spring 9 and the damper chamber 5 are separated from each other in the axial direction. At least the winding portion 9a of the coil spring 9 may be axially separated from the damper chamber 5, and the other end 9c of the coil spring 9 may be arranged inside the damper chamber 5. An outer diameter $\Phi 1$ of the winding portion 9a of the coil spring 9 is larger than an inner diameter $\Phi 2$ of the damper chamber 5 (outer diameter $\Phi 2$ of the step portion of the shaft 3 (see FIG. 1)). The winding portion 9a of the coil spring 9 is arranged outside the shaft 3.

According to the present embodiment, since the winding portion 9a of the coil spring 9 is axially separated from the damper chamber 5, the outer diameter $\Phi 1$ of the winding portion 9a of the coil spring 9 can be increased without increasing the outer diameter of the case 2. Therefore, a wire diameter of the coil spring 9 can be increased, and the torque of the coil spring 9 can be increased. Further, since the bearing member 4 that closes the one end of the damper chamber 5 is arranged between the winding portion 9a of the coil spring 9 and the damper chamber 5, it is possible to prevent the fluid filled in the damper chamber 5 from leaking to a side of the coil spring 9.

The spring holding member 7 has a substantially bottomed cylindrical shape. The spring holding member 7 has a tubular portion 7a surrounding the coil spring 9 and a bottom portion 7b to which the one end 9b of the coil spring 9 is connected. The spring holding member 7 is inserted into the case 2 in the one direction (to the right direction in FIG. 1). The spring holding member 7 is non-rotatable with respect to the case 2 and is movable in the axial direction so that the damper force can be adjusted. A plurality of protrusions 7c (see FIG. 2) are formed on an outer surface of the spring holding member 7 in the circumferential direction. The protrusions 7c fit into a groove formed on an inner surface of the fitting hole 2a of the case 2.

Reference numeral 10 denotes an opening/closing detection shaft. The opening/closing detection shaft 10 is inserted into the shaft 3 and is non-rotatably connected to the shaft 3. The opening/closing detection shaft 10 penetrates the spring holding member 7 and is rotatably supported by the spring holding member 7. A magnet (not shown) is attached to a tip of the opening/closing detection shaft 10 exposed from the case 2. By detecting magnetic flux of the magnet, the opening and closing of the toilet lid (or toilet seat) can be detected. The opening/closing detection shaft 10 may be omitted.

The lid member 8 has a screw on an outer surface thereof screwed with the screw 2c on the inner surface of the case 2. The shaft 3, the bearing member 4, the coil spring 9, the opening/closing detection shaft 10, and the spring holding member 7 are inserted into the fitting hole 2a of the case 2 in the same direction, and then the lid member 8 is screwed into the case 2 so that these parts are prevented from coming off from the case 2. Here, since these parts are inserted into the case 2 in the same direction, only one lid member 8 is required, and the damper device 1 can be easily assembled.

The spring holding member 7 is sandwiched between the lid member 8 and the bearing member 4. When the case 2 is screwed into the lid member 8, the lid member 8 pushes the bearing member 4 via the spring holding member 7, so that the damper force can be adjusted by adjusting a gap between the partition wall 5a of the bearing member 4 and a blade portion 15 or a valve body 17 (see FIG. 3). In this way, the damper force can be easily adjusted on the side of the shaft 3 opposite to the connecting part 3b. After adjusting the damper force, the lid member 8 and the spring holding member 7 are fixed to the case 2 by a pin 13. The lid member 8 may be fixed to the case 2 by welding or the like without using the pin 13.

As shown in FIG. 3(a), the blade portion 15 is formed on the outer surface of the shaft part 3a facing the damper chamber 5, and a partition wall portion 16 is formed on the inner surface of the case 2 facing the damper chamber 5. The inside of the damper chamber 5 is divided into four parts in the circumferential direction by the blade portion 15 and the partition wall portion 16, and two first chambers S1 and two second chambers S2 are formed. In this regard, the blade portion 15 and the partition wall portion 16 may be formed one by one to form one first chamber S1 and one second chamber S2.

The blade portion 15 includes a pair of protrusions 15a and 15b having a V-shaped cross section. One protrusion 15b is formed with a notch 15b1 through which the fluid can pass without resistance (see FIG. 2). The valve body 17 as a flow rate control unit is housed in a valve chamber between the protrusions 15a and 15b. As shown in FIG. 3(a), when the shaft 3 rotates in the closing direction (in the X direction in the drawing), the valve body 17 closes the flow path between the protrusion 15a and the case 2 so that the fluid in the second chamber S2 is prevented from flowing to the first chamber S1 adjacent to the left. The fluid in the second chamber S2 flows into the first chamber S1 adjacent to the right through a minute gap between the partition wall portion 16 and the shaft portion 3a. Therefore, when the shaft 3 rotates in the closing direction, the damper force is applied to the shaft 3 and the rotation speed of the shaft 3 in the closing direction is suppressed. Further, since the shaft 3 is energized in the opening direction by the coil spring 9, the rotation speed of the shaft 3 in the closing direction is also suppressed by the coil spring 9.

On the other hand, as shown in FIG. 3(b), when the shaft 3 rotates in the opening direction (in the Y direction in the drawing), the valve body 17 opens the flow path between the protrusion 15a and the case 2 and allows the fluid in the first chamber S1 to flow to the second chamber S2 adjacent to the left. Since the fluid in the first chamber S1 can flow into the second chamber S2 without resistance through the notch 15b1, the shaft 3 rotates in the opening direction without resistance. The damper force generated when the shaft 3 rotates in the opening direction is smaller than the damper force generated when the shaft 3 rotates in the closing direction. Since the shaft 3 is energized in the opening direction by the coil spring 9, the toilet lid (or toilet seat) can be lifted with a light force.

Second Embodiment

Figure 4:
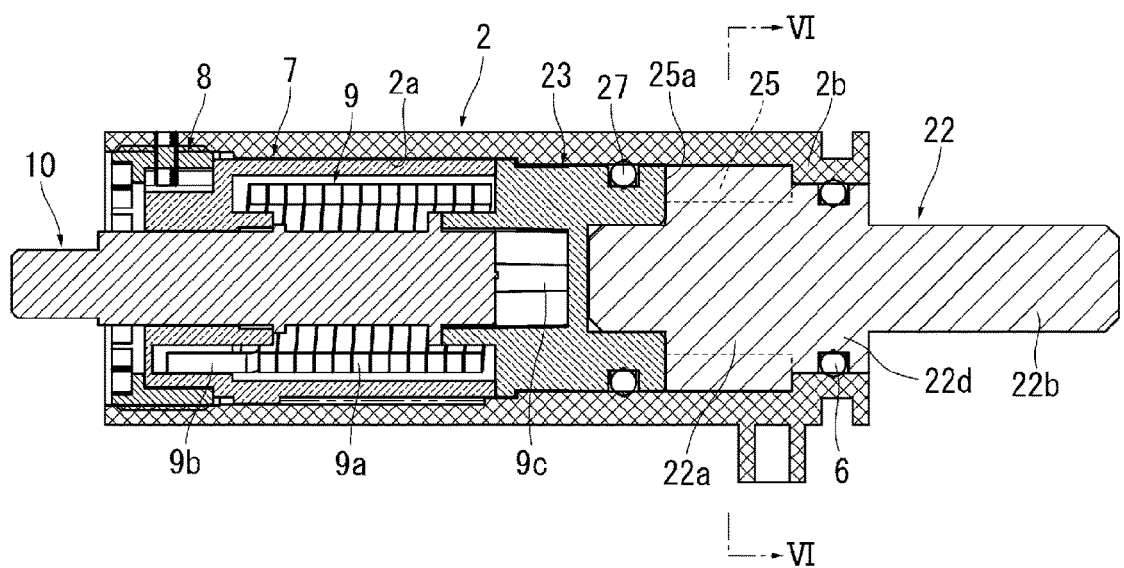
FIG. 4 is a cross-sectional view taken along the axis of the damper device of the second embodiment according to the present invention.
Figure 5:
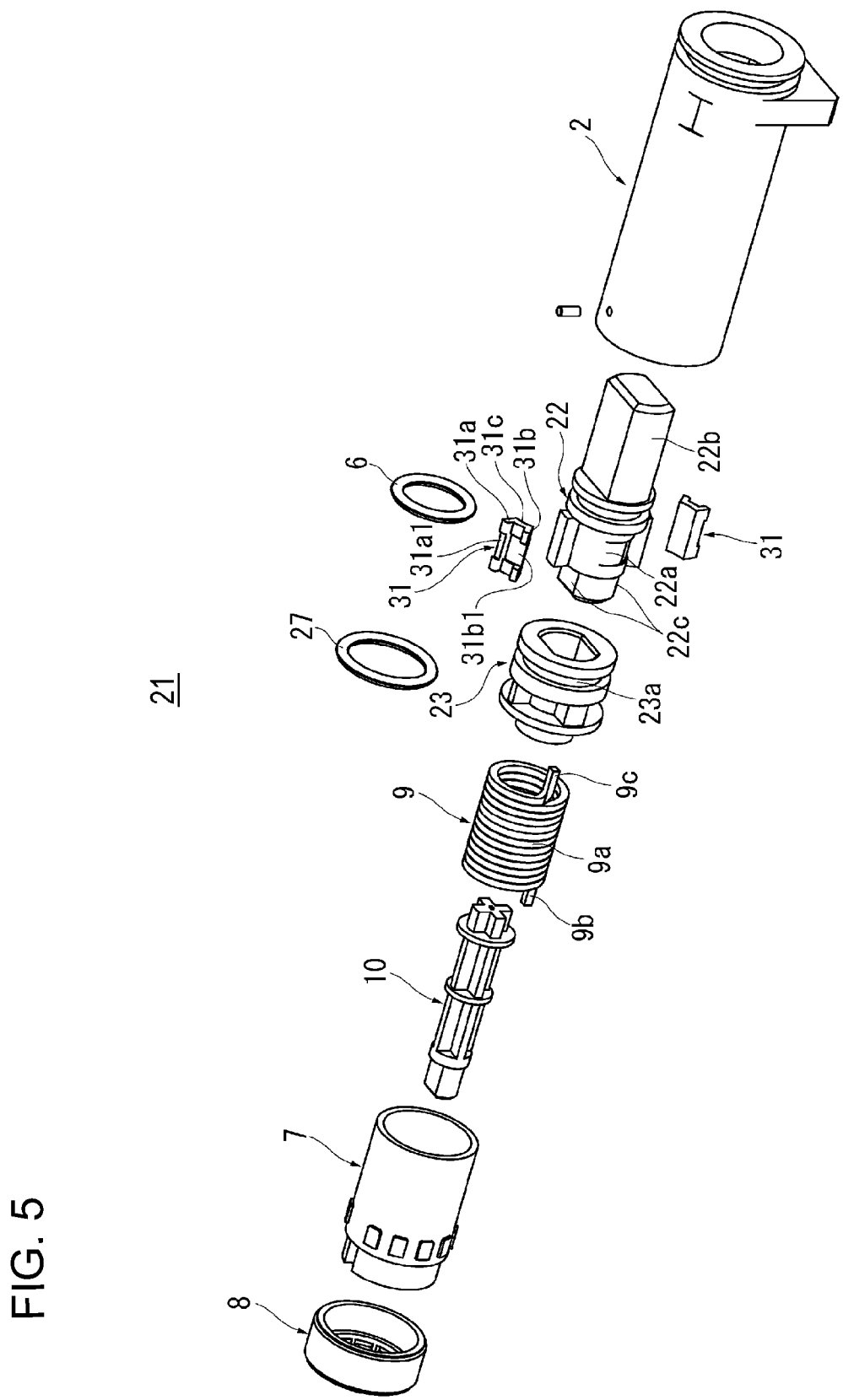
FIG. 5 is an exploded perspective view of the damper device of the second embodiment.

FIG. 4 is a cross-sectional view taken along the axis of the damper device of the second embodiment according to the present invention and FIG. 5 is an exploded perspective view of the damper device of the second embodiment. A damper device 21 of the second embodiment also includes the case 2, a shaft 22, a bearing member 23, the coil spring 9, the spring holding member 7, the opening/closing detection shaft 10 and the lid member 8. Since the configurations of the case 2, the coil spring 9, the spring holding member 7, the opening/closing detection shaft 10 and the lid member 8 are substantially the same as those of the first embodiment, the same reference numerals are given and the description thereof will be omitted.

The shaft 22 includes a shaft part 22a inserted into the fitting hole 2a of the case 2 and a connecting part 22b protruding from the end wall 2b of the case 2. One end of the shaft portion 22a is non-rotatably fitted to the bearing member 23. A pair of parallel flat surfaces 22c (see FIG. 5) are formed at the one end of the shaft part 22a. The shaft part 22a is rotatably supported by the case 2 via the bearing member 23. A journal portion 22d at the other end of the shaft part 22a is rotatably supported by the end wall 2b of the case 2. The sealing member 6 for preventing the fluid filled in a damper chamber 25 from leaking is arranged between the journal portion 22d and the end wall 2b.

The bearing member 23 forms a partition wall 25a that closes one end of the damper chamber 25 in the axial direction. The bearing member 23 is rotatable with respect to the case 2. A sliding sealing member 27 such as an O-ring that prevents the fluid filled in the damper chamber 25 from leaking is arranged between the case 2 and the bearing member 23. On the outer surface of the bearing member 23, a groove 23a into which the sliding sealing member 27 is fitted is formed (see FIG. 5).

The one end 9b of the coil spring 9 is connected to the side of the case 2, and the other end 9c is connected to the side of the shaft 22. The one end 9b of the coil spring 9 is connected to the spring holding member 7. The other end 9c of the coil spring 9 is connected to the bearing member 23. The coil spring 9 applies torque to the shaft 22 with respect to the case 2 and energizes the case 2 in the direction of opening the toilet lid (or toilet seat) (in the direction of arrow Y in FIG. 6(b)).

The bearing member 23 is arranged between the winding portion 9a of the coil spring 9 and the damper chamber 25. The winding portion 9a of the coil spring 9 and the damper chamber 25 are separated from each other in the axial direction. Therefore, the outer diameter of the winding portion 9a of the coil spring 9 can be increased without increasing the outer diameter of the case 2. Further, since the bearing member 23 that closes the one end of the damper chamber 25 is arranged between the winding portion 9a of the coil spring 9 and the damper chamber 25, it is possible to prevent the fluid filled in the damper chamber 25 from leaking to the side of the coil spring 9.

The shaft 22, the bearing member 23, the coil spring 9, the opening/closing detection shaft 10, and the spring holding member 7 are inserted into the fitting hole 2a of the case 2 in the same direction, and then the lid member 8 is screwed into the case 2 so that these parts are prevented from coming off from the case 2. Here, since these parts are inserted into the case 2 in the same direction, only one lid member 8 is required, and the damper device 1 can be easily assembled.

Figure 6:
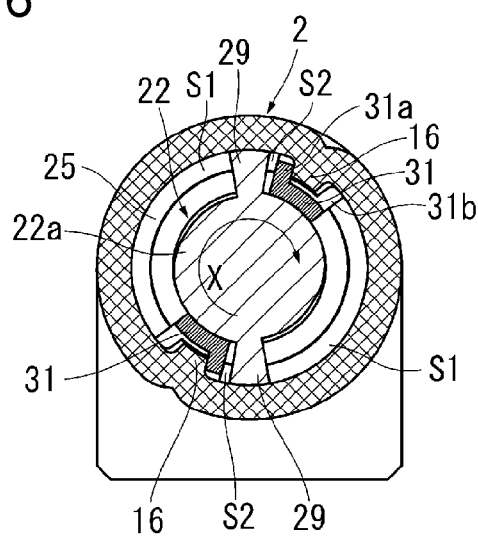
FIG. 6 is a cross-sectional view taken along line VI-VI of FIG. 4 (FIG. 6 (*a*) shows a case where the shaft rotates in a closing direction, and FIG. 6 (*b*) shows a case where the shaft rotates in an opening direction).
Figure 6:
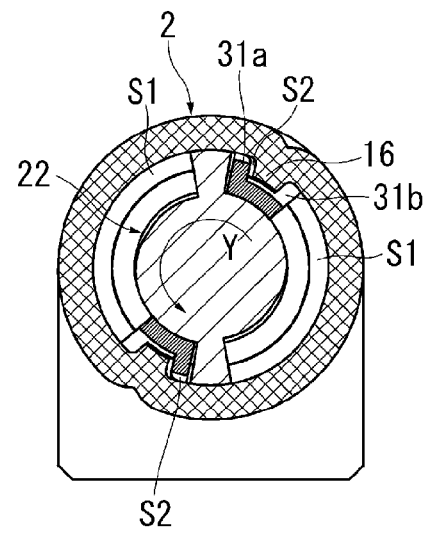

As shown in FIG. 6(a), a blade portion 29 is formed on the outer surface of the shaft part 22a facing the damper chamber 25, and the partition wall portion 16 is formed on the inner surface of the case 2 facing the damper chamber 25. The inside of the damper chamber 25 is divided into four parts in the circumferential direction by the blade portion 29 and the partition wall portion 16, and two first chambers S1 and two second chambers S2 are formed.

A valve body 31 having a U-shaped cross section as a flow rate control unit is mounted on the partition wall portion 16 of the damper chamber 25. The valve body 31 includes a pair of opposing walls 31a and 31b and a connecting wall 31c connecting the pair of opposing walls 31a and 31b (see FIG. 5). A shallow notch 31a1 is formed on the one opposing wall 31a, and a deep notch 31b1 is formed on the other opposing wall 31b. As shown in FIG. 6(a), when the shaft 22 rotates in the closing direction (in the X direction in the drawing), the opposing wall 31a of the valve body 31 abuts on the partition wall portion 16 so that the opposing wall 31b of the valve body 31 is separated from the partition wall portion 16. At this time, since the notch 31a1 of the opposing wall 31a is closed, the fluid in the second chamber S2 cannot flow into the first chamber S1 adjacent to the right through the notch 31a1 and flows into the first chamber S1 adjacent to the left through a minute gap between the outer surface of the blade portion 29 and the inner surface of the case 2. Therefore, a large resistance is generated for the fluid in the second chamber S2 to flow into the first chamber S1, and the damper force applies to the shaft 22.

On the other hand, as shown in FIG. 6(b), when the shaft 22 rotates in the opening direction (in the Y direction in the drawing), the opposing wall 31a of the valve body 31 is separated from the partition wall portion 16 so that the opposing wall 31b abuts on the partition wall portion 16. Therefore, the valve body 31 allows the fluid in the first chamber S1 to flow through the notch 31b1 in the opposing wall 31b and the notch 31a1 in the opposing wall 31a to the second chamber S2 adjacent to the left. Since the fluid in the first chamber S1 can flow into the second chamber S2 without resistance through the notches 31b1 and 31a1, the shaft 22 rotates in the opening direction without resistance.

It should be noted that the present invention is not limited to being embodied in the above-described embodiment, and can be modified to other embodiments within the scope of the gist of the present invention. For example, in the above embodiment, the damper force is generated only when the shaft rotates in the X direction, but the damper force may be generated when the shaft rotates in any of the X and Y directions.

The present specification is based on patent application No. JP 2018-244675 filed on Dec. 27, 2018. The contents of this application are incorporated herein in its entirety.

DESCRIPTION OF REFERENCES

2 . . . Case
3 . . . Shaft
4 . . . Bearing member
5 . . . Damper chamber
5a . . . Partition wall
7 . . . Spring holding member
8 . . . Lid member
9 . . . Coil spring
9a . . . Winding portion
9b . . . One end of the coil spring
9c . . . Other end of the coil spring
11 . . . Fixed sealing member
12 . . . Sliding sealing member
21 . . . Damper device
22 . . . Shaft
23 . . . Bearing member
25 . . . Damper chamber
25a . . . Partition wall
27 . . . Sliding sealing member

What is claimed is:

1. A damper device comprising:
a case,
a shaft that is relatively rotatable with respect to the case,
fluid filled in a damper chamber formed between the case and the shaft,
a bearing member that forms a partition wall that closes one end of the damper chamber in an axial direction and is separate from the shaft, and
a coil spring having one end connected to a side of the case and the other end connected to the shaft or the bearing member to apply torque to the shaft with respect to the case,
wherein the bearing member is arranged between a winding portion of the coil spring and the damper chamber, and the winding portion of the coil spring and the damper chamber are separated from each other in the axial direction,
wherein a sliding sealing member is arranged between the bearing member and the shaft that is rotatable with respect to the bearing member, and a fixed sealing member is arranged between the case and the bearing member that is non-rotatable with respect to the case.

2. The damper device as claimed in claim 1, wherein a sliding sealing member is arranged between the case and the bearing member that is rotatable with respect to the case, and the shaft is non-rotatable with respect to the bearing member.

3. The damper device as claimed in claim 2, wherein the shaft, the bearing member and the coil spring are inserted into the case in the same direction.

4. The damper device as claimed in claim 2, further comprising a lid member screwed onto an inner surface of the case and a spring holding member that is sandwiched between the lid member and the bearing member and is non-rotatable with respect to the case and movable in the axial direction.

5. The damper device as claimed in claim 1, wherein the shaft, the bearing member and the coil spring are inserted into the case in the same direction.

6. The damper device as claimed in claim 5, further comprising a lid member screwed onto an inner surface of the case and a spring holding member that is sandwiched between the lid member and the bearing member and is non-rotatable with respect to the case and movable in the axial direction.

7. The damper device as claimed in claim 1, further comprising a lid member screwed onto an inner surface of the case and a spring holding member that is sandwiched between the lid member and the bearing member and is non-rotatable with respect to the case and movable in the axial direction.

8. The damper device as claimed in claim 1, wherein the shaft, the bearing member and the coil spring are inserted into the case in the same direction.

9. The damper device as claimed in claim 1, further comprising a lid member screwed onto an inner surface of the case and a spring holding member that is sandwiched between the lid member and the bearing member and is non-rotatable with respect to the case and movable in the axial direction.

* * * * *